United States Patent
Reusche et al.

(10) Patent No.: US 7,669,556 B2
(45) Date of Patent: Mar. 2, 2010

(54) PET PLATFORM ASSEMBLY

(75) Inventors: Thomas K. Reusche, Elburn, IL (US);
Philip E. Chumbley, Aurora, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 202 days.

(21) Appl. No.: 11/686,216

(22) Filed: Mar. 14, 2007

(65) Prior Publication Data
US 2007/0215054 A1 Sep. 20, 2007

Related U.S. Application Data

(60) Provisional application No. 60/783,742, filed on Mar. 17, 2006.

(51) Int. Cl.
*A01K 1/00* (2006.01)
(52) U.S. Cl. ...................... 119/484; 119/485
(58) Field of Classification Search ............. 119/484, 119/485, 28.5; 211/87.01
See application file for complete search history.

(56) References Cited

U.S. PATENT DOCUMENTS

| | | | | |
|---|---|---|---|---|
| 1,224,127 A * | 5/1917 | Bartlett | .................. | 248/208 |
| 1,627,241 A * | 5/1927 | Johnson | .................. | 248/236 |
| 2,166,344 A * | 7/1939 | Donohue | .............. | 407/29.15 |
| 3,089,211 A * | 5/1963 | Perusse | .................. | 24/556 |
| 3,173,398 A * | 3/1965 | Raymond | ................ | 119/28.5 |
| 3,722,843 A * | 3/1973 | Enckler | .................. | 248/300 |
| 3,857,365 A * | 12/1974 | Mueller | .................. | 119/28.5 |
| 4,057,031 A * | 11/1977 | Williams et al. | .......... | 119/28.5 |
| 4,158,905 A * | 6/1979 | O'Leary | ................... | 24/530 |
| 4,445,459 A * | 5/1984 | Julie | ........................ | 119/28.5 |
| 4,475,306 A * | 10/1984 | Mehrens | ................... | 47/39 |
| 4,787,591 A * | 11/1988 | Villacorta | ............... | 248/316.7 |
| 4,858,285 A * | 8/1989 | Dala et al. | ................ | 24/555 |
| 4,869,451 A * | 9/1989 | Gordon | .................. | 248/235 |
| 5,148,767 A * | 9/1992 | Torchio | ................... | 119/484 |
| 5,167,202 A * | 12/1992 | Bradford et al. | ........... | 119/452 |
| 5,191,746 A * | 3/1993 | Russell | ....................... | 52/97 |
| 5,304,735 A * | 4/1994 | Earl et al. | ................ | 174/16.3 |
| 5,337,697 A * | 8/1994 | Trimarchi et al. | .......... | 119/484 |
| 5,384,938 A * | 1/1995 | Frederick | .................. | 24/306 |
| 5,509,373 A * | 4/1996 | Elesh | ....................... | 119/28.5 |
| 5,509,634 A * | 4/1996 | Gebka et al. | ............. | 248/316.7 |
| 5,636,408 A * | 6/1997 | Dichtel | ....................... | 16/6 |
| 5,709,164 A * | 1/1998 | Batterton | .................. | 119/28.5 |
| 5,809,933 A * | 9/1998 | Conwell, III | ............... | 119/28.5 |
| 5,890,782 A * | 4/1999 | Alberts | ...................... | 312/196 |
| 5,966,878 A * | 10/1999 | Freund | ..................... | 52/127.2 |
| 6,007,036 A * | 12/1999 | Rosen | ...................... | 248/286.1 |
| 6,148,488 A * | 11/2000 | Gristock | .................... | 24/462 |
| 6,189,487 B1 * | 2/2001 | Owen et al. | ............... | 119/28.5 |

(Continued)

*Primary Examiner*—Yvonne R. Abbott
(74) *Attorney, Agent, or Firm*—McAndrews, Held & Malloy, Ltd.

(57) ABSTRACT

A pet platform assembly configured to securely mount to a window sill may include a base configured to support the weight of a pet, at least one clamp secured to the base, and a support bracket secured to an underside of the base. The clamp is configured to securely mount the base to an edge of the window sill. The support bracket is configured to brace the base with respect to a wall that supports the window sill. The support bracket may include a cord passage that routes the electrical cord therethrough.

24 Claims, 3 Drawing Sheets

U.S. PATENT DOCUMENTS

| | | | |
|---|---|---|---|
| 6,220,557 B1 * | 4/2001 | Ziaylek et al. | 248/316.1 |
| 6,223,665 B1 * | 5/2001 | Hindsley | 112/117 |
| 6,360,689 B1 * | 3/2002 | Weinert | 119/51.01 |
| 6,588,366 B1 * | 7/2003 | Ranson et al. | 119/28.5 |
| 6,622,652 B1 * | 9/2003 | Wang | 119/28.5 |
| 6,915,995 B2 * | 7/2005 | Gillespie | 248/278.1 |
| 7,168,202 B2 * | 1/2007 | Kohler | 43/25.2 |
| 7,316,089 B2 * | 1/2008 | Brinkman | 40/642.02 |
| 2003/0154579 A1 * | 8/2003 | Disher | 24/462 |

* cited by examiner

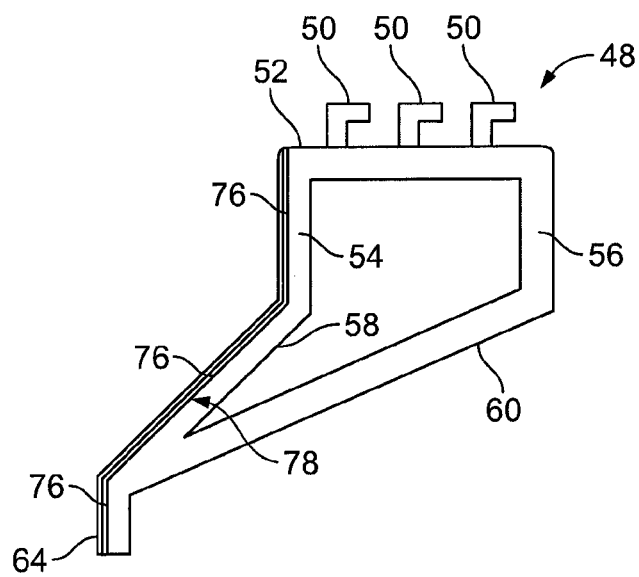
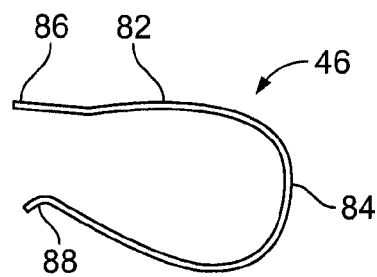
FIG. 3    FIG. 4
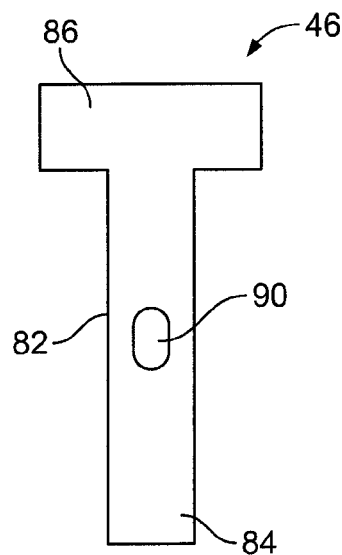
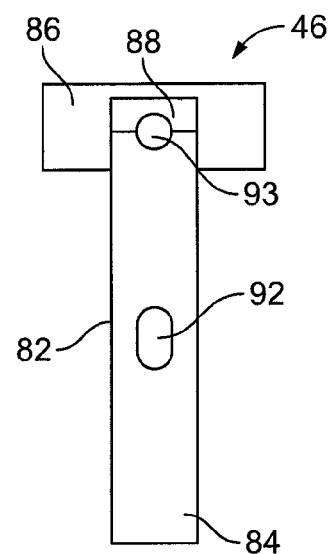
FIG. 5    FIG. 6

PET PLATFORM ASSEMBLY

RELATED APPLICATIONS

The present application relates to and claims priority from U.S. Provisional Application No. 60/783,742, entitled "Clamp for Attaching a Pet Platform to a Window Sill," filed on Mar. 17, 2006, which is hereby incorporated by reference in its entirety.

BACKGROUND OF THE INVENTION

Embodiments of the present application generally relate to a pet platform assembly, and more particularly to a pet platform assembly that safely and securely mounts to a window sill.

Domestic animals, such as dogs and cats, are often inquisitive and curious. In many instances, domestic animals look at an outside environment through windows of homes in which they live. For example, domestic animals may be intrigued by the actions of wildlife, such as birds, dogs, or cats, outside a home.

Windows are typically positioned, however, above a surface of a floor. Thus, small cats and dogs may have difficulty positioning themselves to look out a particular window.

In order to allow domestic pets to easily and comfortably position themselves to look out windows, various pet platforms, or perches, have been developed. A typical pet platform attaches to a standard window sill and rests with one side supported by the window sill. Typically, the platform is securely mounted to the window sill through fasteners, such as screws or bolts, and/or glue or tape.

FIG. 1 illustrates a side view of a conventional pet platform assembly 10 according to an embodiment of the present invention. The platform assembly 10 is secured to a window sill 12 that supports a window 14. The platform assembly 10 includes a base 16 that may support a cushion 18. A heating pad 20 may be positioned between the base 16 and the cushion 18 and is configured to heat the cushion 16. The heating pad 20 includes an electrical cord 22 having a plug 24 that is configured to electrically connect to a standard wall outlet 26.

As shown in FIG. 1, an end 28 of the base 16 is securely fastened to the window sill 12 through a fastener 30, such as a screw. Optionally, the end 28 may be secured to the window sill 12 through glue, or tape. An opposite end 31 of the base 16 freely extends into a room, so that a domestic pet may easily climb or hop up onto the platform assembly 10.

A support bracket 32 secures to an underside of the base 16 by way of a series of tabs 34 securely mating into reciprocal slots or openings formed in the base 16. The bracket 32 also includes a free end 36 that abuts into a wall 38 that supports the window sill 12. Thus, the support bracket 32 acts as a supporting brace for the platform assembly 16. The support bracket 32 is generally wedged between the base 16 and the wall 38, thereby providing additional vertical support and stability for the platform assembly 10.

When the platform assembly 10 is removed from the window sill 12, the fastener 30 used to secure the end 28 of the base 16 to the window sill 12 is also removed. However, because the fastener 30 was driven through the window sill 12, removal of the fastener 30 leaves an unsightly blemish (i.e., a fastener channel) in the window sill 12. Moreover, if the fastener 30 is reinserted into the fastener channel, the sight of an exposed fastener on a window sill may also be less than aesthetically pleasing.

If, however, glue or tape is used to secure the end 28 of the base 16 to the window sill 12, the tape or glue may mar or destroy the finish of the window sill 12 when removed. Thus, the use of tape or glue to secure the end 28 of the base 16 to the window sill 12 may also blemish the window sill 12.

Additionally, the cord 22 of the heating pad 20 hangs down from the base 16. The hanging cord 22 may also provide an eyesore. Moreover, curious domestic pets may be tempted to bat, tug, chew, or otherwise play with the hanging cord 22, thereby causing a potential safety hazard.

Thus, a need exists for a pet platform assembly that does not damage the surface and/or finish of a window sill. Additionally, a need exits for a pet platform assembly that hides an electrical cord from view. Also, a need exists for a pet platform assembly that protects domestic pets from potential safety hazards associated with manipulation of the electrical cord.

SUMMARY OF THE INVENTION

Certain embodiments of the present invention provide a pet platform assembly configured to securely mount to a window sill. The pet platform assembly includes a base configured to support a pet, and a clamp secured to the base. The clamp is configured to securely mount the base to an edge of the window sill. The base is configured to securely mount to the edge of the window sill without compromising the surface and/or finish of the window sill.

The clamp may be a C-shaped clamp having a flexible intermediate body integrally connected to opposed sill pinching ends. The base may include a threaded bolt that passes through the clamp. A wing nut may threadably engage the threaded bolt, such that the clamp is adjustably sandwiched between the wing nut and the base.

The pet platform assembly may also include a support bracket that bracingly supports the base. The support bracket is configured to be wedged between the base and a wall that supports the window sill. The support bracket may include a cord passage that is configured to route an electrical cord from the base to the wall.

The pet platform assembly may also include a cushion positioned over the base. The assembly may also include a heating pad positioned over the base.

Certain embodiments of the present invention provide a pet platform assembly that includes a base configured to support a pet, a heating element positioned on the base, with the heating element having an electrical cord, and a support bracket secured to an underside of said base, wherein the support bracket includes a cord passage that routes the electrical cord therethrough. A cover may be removably secured over the cord passage and the electrical cord.

The support bracket may include an angled beam integrally connected to a wall shank, wherein the cord passage passes through the angled beam and the wall shank. The electrical cord may pass out of the wall shank adjacent a wall that supports the window sill.

Certain embodiments of the present invention provide a pet platform assembly that includes a base configured to support a pet, a plurality of clamps secured to the base, a heating element, which has an electrical cord, positioned on the base, a cushion positioned over the heating element, and a support bracket secured to an underside of the base. Each clamp is configured to securely mount the base to an edge of the window sill. The support bracket is configured to brace the base with respect to a wall that supports the window sill. The support bracket includes a cord passage that routes the electrical cord therethrough.

BRIEF DESCRIPTION OF SEVERAL VIEWS OF THE DRAWINGS

FIG. 3 illustrates a side view of a support bracket according to an embodiment of the present invention.

FIG. 4 illustrates a side view of a clamp according to an embodiment of the present invention.

FIG. 5 illustrates a top view of a clamp according to an embodiment of the present invention.

FIG. 6 illustrates a bottom view of a clamp according to an embodiment of the present invention.

Figure 1:
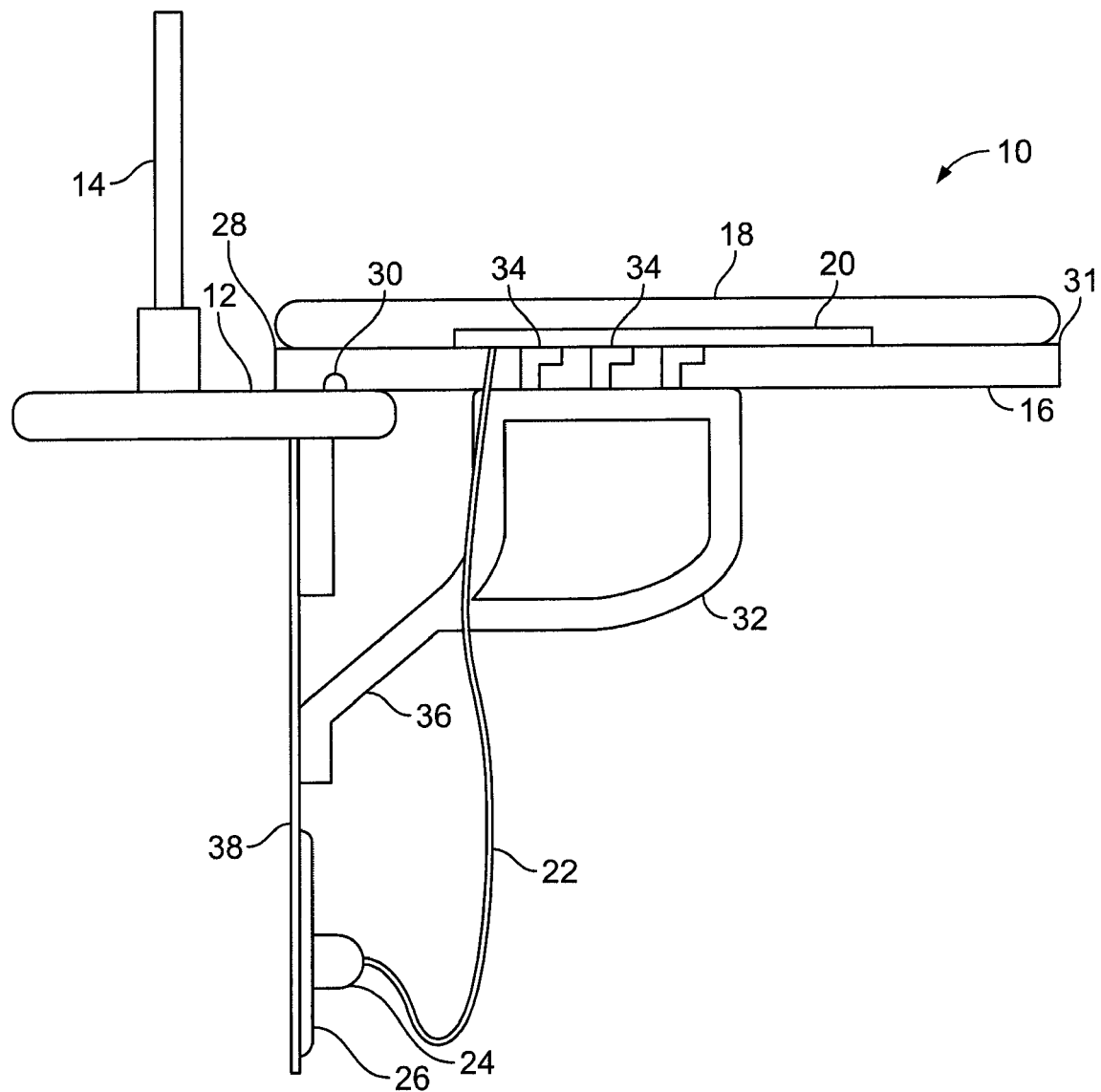
FIG. 1 illustrates a side view of a conventional pet platform assembly 10 according to an embodiment of the present invention.

The foregoing summary, as well as the following detailed description of certain embodiments of the present invention, will be better understood when read in conjunction with the appended drawings. For the purpose of illustrating the invention, there are shown in the drawings, certain embodiments. It should be understood, however, that the present invention is not limited to the arrangements and instrumentalities shown in the attached drawings.

DETAILED DESCRIPTION OF THE INVENTION

Figure 2:
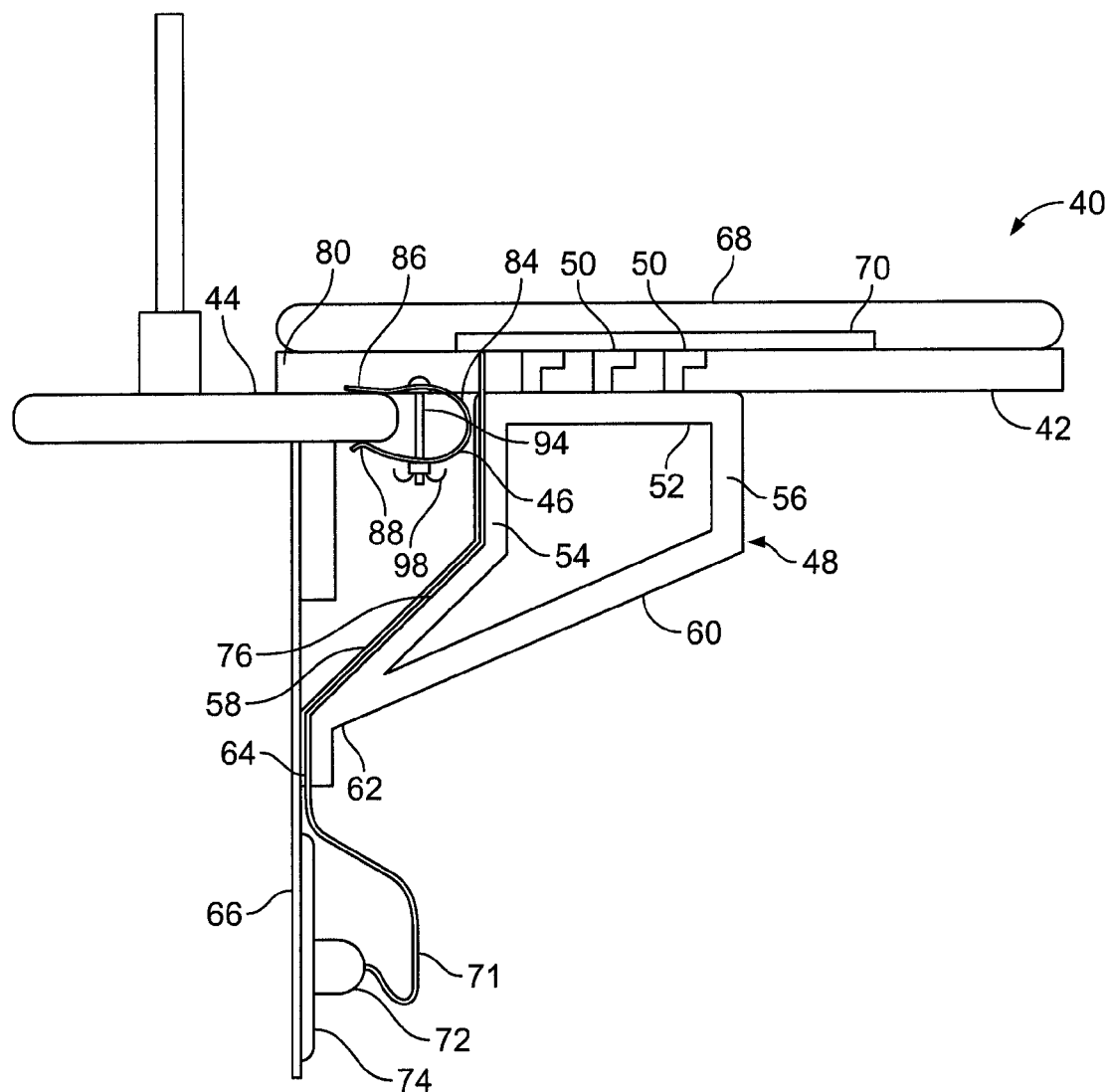
FIG. 2 illustrates a side view of a pet platform assembly according to an embodiment of the present invention.

FIG. 2 illustrates a side view of a pet platform assembly 40 according to an embodiment of the present invention. The pet platform assembly 40 includes a base 42 secured to a window sill 44 through a clamp 46.

A support bracket 48 is secured to an underside of the base 42 through a series of tabs 50 that securely mate with reciprocal slots or openings formed in the base 42. Optionally, the base 42 may include tabs, while the support bracket 48 includes reciprocal slots or openings.

The support bracket 48 includes a flat upper wall 52 from which the tabs 50 upwardly extend. The upper wall 52 is, in turn, integrally connected to vertical beams 54 and 56. The inner vertical beam 54 is integrally connected to an angled beam 58, while the outer vertical beam 56 is integrally connected to an angled beam 60 that is longer than the angled beam 58. The angled beams 58 and 60 meet at an apex 62, which is in turn, integrally connected to a vertical wall shank 64 that is biased into a wall 66. The wall shank 64 may be padded so as not to damage the surface of the wall 66. As such, the support bracket 48 provides vertical support and stability to the base 42 without being permanently secured to the wall 66.

The base 42 supports a cushion 68 configured to comfortably support a pet. A heating element 70 is secured between the base 42 and the cushion 68 and is configured to heat the cushion 68. The heating element 70 includes a cord 71 having a plug 72 that is configured to electrically connect to a standard wall outlet 74.

The support bracket 48 also includes a cord passage 76 formed through the vertical wall 54, the angled wall 58 and the wall shank 64. The cord 71 is routed through the cord passage 76.

FIG. 3 illustrates a side view of the support bracket 48. As shown in FIG. 3, the cord passage 76 routes the cord 71 (shown in FIG. 2) through the upper wall 52 into the vertical beam 54, into the angled beam 58, and out through the wall shank 64. The cord passage 76 through the wall shank 64 may be adjacent the wall 66 so that the cord 71 exits the cord passage 76 adjacent the wall 66. The cord passage 76 may be a tubular or semi-tubular passage or groove 78 that allows the cord to slide therethrough. Additionally, the cord passage 76 may include a series of clamps, flaps, or the like configured to secure the cord 71 in position. For example, the cord 71 may have a slightly larger diameter than the cord passage 76. As such, the cord passage 76 may compressively capture the cord 71 in place.

A cover (not shown) may be positioned over the cord 71 and the cord passage 76 to completely hide the cord 71 from view. The cover may snapably, latchably, or otherwise removably secure to the support bracket 48 over the cord passage 76.

The cord passage 76 formed through the support bracket 48 neatly and efficiently secures and/or covers the cord 71, thereby hiding the majority of the cord 71 from view. Thus, certain embodiments of the present invention provide a pet platform assembly that conceals the majority of the electrical cord 71 from view and protects domestic pets from playing with a potential safety hazard. As shown in FIG. 2, most of the electrical cord 71 is secured to and/or within the support bracket 48, unlike the prior art pet platform in which the cord hung down from the platform base.

Referring again the FIG. 2, an end 80 of the base 42 is secured to the window sill 44 through the clamp 46. The clamp 46 securely mounts the base 42 to the window sill 44 without the use of screws, glue, or adhesive.

FIGS. 4, 5, and 6 illustrate side, top, and bottom views of the clamp 46, respectively. Referring to FIGS. 4-6, the clamp 46 includes a main body 82 having a flexible, curved intermediate section 84 integrally connected to an upper sill pinching end 86 and a lower sill pinching end 88, thereby forming an approximate C shape (inverted in FIG. 4). Vertically aligned fastener holes 90 and 92 are formed through the intermediate section 84.

An additional fastener through hole 93 may be formed through the lower sill pinching end 88. A fastener, such as a screw, may be positioned through the fastener through hole 93 and secured into an underside of a window sill for additional gripping support.

Referring to FIGS. 2, and 4-6, a threaded fastener 94 is secured into the base 42, and extends downwardly therefrom. The clamp 46 is positioned on the fastener 94 such that the fastener 94 passes through the aligned fastener holes 90 and 92. The edge of the window sill 44 is positioned between the upper and lower sill pinching ends 86 and 88 of the clamp 46. A wing nut 98 is threadably positioned on the fastener 94 below the curved intermediate section 84. As the wing nut 98 is tightened, the force exerted by the wing nut 98 into the clamp 46 causes the curved intermediate section 84 to inwardly flex, thereby causing the upper and lower sill pinching ends 86 and 88 to move toward one another. The wing nut 98 continues to be tightened until the edge of the window sill 44 is securely sandwiched between the upper and lower sill pinching ends 86 and 88. The upper and low sill pinching ends 86 and 88 may include rubber or padded interior surfaces in order to further protect the surface of the window sill 44.

Thus, the base 42 is secured to the clamp 46 through the fastener 94 and the wing nut 98. Further, the base 42 securely mounts to the window sill 44 by way of the edge of the window sill 44 being compressively sandwiched between the upper and lower sill pinching ends 86 and 88. The support bracket 48 provides additional vertical support and stability to the base 42, as discussed above. The support bracket 48 also conceals the electrical cord 71 due to the cord passage 76. The base 42 may be secured to the window sill 44 through a plurality of clamps 46.

While the clamp 46 is shown using the wing nut 98 threaded onto the fastener 94, various other clamps may be used to safely and securely mount the base 42 to the window sill 44. For example, a dial, latch, lock, clasp, or various other such components may be used to selectively tighten and loosen the clamp 46 without damaging the surface of the window sill 44.

Alternatively, the pet platform assembly 40 may not include the heating element. Instead, the assembly 40 may include just the base 42 and the cushion 68. Also, the pet platform assembly 40 may include interchangeable heating and cooling elements.

As discussed above, instead of using screws, bolts, tape, or glue to fasten the base to the window sill, certain embodiments of the present invention use clamp. Thus, certain embodiments of the present invention provide a pet platform assembly that does not damage or otherwise compromise the surface and/or finish of a window sill.

While various spatial terms, such as front, rear, upper, bottom, lower, mid, lateral, horizontal, vertical, and the like may used to describe certain aspects of embodiments of the present invention, it is understood that such terms may be used with respect to the orientations shown in the drawings. The orientations may be inverted, rotated, or otherwise changed, such that a front edge is a rear edge, and vice versa, etc.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A pet platform assembly configured to securely mount to a window sill, the pet platform assembly comprising:
   a base configured to support a pet; and
   a C-shaped clamp secured to said base, said C-shaped clamp having a flexible intermediate body integrally connected to opposed sill pinching ends, said C-shaped clamp configured to securely mount said base to an edge of the window sill, wherein said base comprises a threaded bolt that passes through said clamp.

2. The pet platform assembly of claim 1, further comprising a wing nut that threadably engages said threaded bolt, wherein said clamp is adjustably sandwiched between said wing nut and said base.

3. The pet platform assembly of claim 1, further comprising a support bracket that bracingly supports said base, wherein said support bracket is configured to be wedged between said base and a wall that supports the window sill.

4. The pet platform assembly of claim 3, wherein said support bracket comprises a cord passage that is configured to route an electrical cord from said base to the wall.

5. The pet platform assembly of claim 4, comprising a cover removably secured over said cord passage.

6. The pet platform assembly of claim 1, further comprising a cushion positioned over said base.

7. The pet platform assembly of claim 1, further comprising a heating pad positioned over said base.

8. The pet platform assembly of claim 1, wherein said base is configured to securely mount to the edge of the window sill without compromising the surface and/or finish of the window sill.

9. The pet platform assembly of claim 1, wherein said opposed sill pinching ends are configured to compressively sandwich an edge of the window sill therebetween.

10. The pet platform assembly of claim 1, wherein said threaded bolt passes through said clamp proximate said opposed sill pinching ends.

11. A pet platform assembly configured to mount to a window sill, the pet platform assembly comprising:
    a base configured to support a pet;
    a heating element positioned on said base, said heating element having an electrical cord;
    a support bracket secured to an underside of said base, said support bracket comprising a cord passage that routes said electrical cord therethrough; and
    a cover removably secured over said cord passage and said electrical cord.

12. The pet platform assembly of claim 11, wherein said support bracket comprises an angled beam integrally connected to a wall shank, wherein said cord passage passes through said angled beam and said wall shank, and wherein said cord passage is configured to pass said electrical cord out of said wall shank adjacent a wall that supports the window sill.

13. The pet platform assembly of claim 11, further comprising a clamp secured to said base, wherein said base is configured to securely mount to an edge of the window sill through said clamp.

14. The pet platform assembly of claim 13, wherein said clamp is a C-shaped clamp having a flexible intermediate body integrally connected to opposed sill pinching ends, wherein said sill pinching ends are configured to compressively sandwich an edge of the window sill therebetween.

15. A pet platform assembly configured to securely mount to a window sill, the pet platform assembly comprising:
    a base configured to support a pet;
    a plurality of clamps secured to said base, each of said plurality of clamps configured to securely mount said base to an edge of the window sill;
    a heating element positioned on said base, said heating element having an electrical cord
    a cushion positioned over said heating element; and
    a support bracket secured to an underside of said base, said support bracket configured to brace said base with respect to a wall that supports the window sill, said support bracket comprising a cord passage that routes said electrical cord therethrough.

16. The pet platform assembly of claim 15, wherein each of said plurality of clamps is a C-shaped clamp having a flexible intermediate body integrally connected to opposed sill pinching ends.

17. The pet platform assembly of claim 16, wherein said opposed sill pinching ends are configured to compressively sandwich an edge of the window sill therebetween.

18. The pet platform assembly of claim 16, wherein said base comprises a plurality of threaded bolts, each of said plurality of threaded bolts passing through one of said plurality of clamps.

19. The pet platform assembly of claim 18, further comprising a plurality of wing nuts, each of said plurality of wing nuts threadably engaging one of said plurality of threaded bolts, wherein each of said plurality of clamps is adjustably sandwiched between one of said plurality of wing nuts and said base.

20. The pet platform assembly of claim 15, further comprising a cover removably secured over said cord passage and said electrical cord.

21. The pet platform assembly of claim 15, further comprising a bracket comprises an angled beam intergrally connected to a wall shank, wherein said cord passage passes through said angled beam and said wall shank, and wherein said electrical cords is configured to pass out of said wall shank a wall that supports said window sill.

22. The pet platform assembly of claim 15, wherein said base is configured to securely mount to an edge of the window sill without compromising the surface and/or finish of the window sill.

23. A pet platform assembly configured to mount to a window sill, the pet platform assembly comprising:

a base configured to support a pet;

a clamp secured to said base, wherein said base is configured to securely mount to an edge of the window sill through said clamp;

a heating element positioned on said base, said heating element having an electrical cord; and a support bracket secured to an underside of said base, said support bracket comprising a cord passage that routes said electrical cord therethrough.

24. The pet platform assembly of claim 23, wherein said clamp is a C-shaped clamp having a flexible intermediate body integrally connected to opposed sill pinching ends, wherein said sill pinching ends are configured to compressively sandwich an edge of the window sill therebetween.

* * * * *